Patented Sept. 25, 1923.

1,468,792

UNITED STATES PATENT OFFICE.

EDWARD A. BARNES, OF OAKLAND, CALIFORNIA, ASSIGNOR TO CALIFORNIA CAP COMPANY, OF OAKLAND, CALIFORNIA, A CORPORATION OF CALIFORNIA.

METHOD OF RECOVERING OXALIC ACID.

No Drawing. Application filed January 2, 1923. Serial No. 610,365.

*To all whom it may concern:*

Be it known that I, EDWARD A. BARNES, a subject of the King of Great Britain, residing at Oakland, county of Alameda, and State of California, have invented new and useful Improvements in a Method of Recovering Oxalic Acid, of which the following is a specification.

This invention relates to a method of recovering oxalic acid from the waste liquors obtained during the manufacture of fulminate of mercury; this application being a continuation in part of my copending application entitled, "Method and apparatus for the manufacture of fulminate of mercury and the recovery of oxalic acid," filed April 3, 1922, Serial No. 548,921.

The residual liquors obtained during the manufacture of fulminate of mercury, whether the fulminate is manufactured under the Chandelons process or otherwise, have generally been considered a waste and as such have been thrown away. The large quantities of waste liquors resulting from the manufacture of fulminate of mercury by the process described in my copending application above referred to, provided quite a problem when their proper disposal was considered and resulted in investigations which conclusively proved that oxalic acid in paying quantities could be obtained. The actual yield of oxalic acid was found in some instances to approximate 30% of the fulminate produced and is, obviously, a considerable item when working on a large scale.

According to the present invention the recovery or production of oxalic acid from the waste liquors is accomplished as follows:

The residual liquors resulting from the process of manufacturing fulminate of mercury contain a large proportion of glycolic acid together with free nitric acid. This liquor is filtered and placed in an evaporator where it is reduced to approximately one-eighth its original bulk, any suitable type of evaporator being employed, or it may be reduced by evaporation until its specific gravity approximates 1.200. Oxidation of the glycolic acid to oxalic acid takes place during evaporation and the oxalic acid crystallizes out in well formed crystals when the liquor is cool. The crystals are then filtered out and by washing the same with a small amount of water, preferably in a centrifugal by means of a spray, all adhering impurities are removed and a product substantially 99½% pure is obtained without further recrystallization. Further concentration of the mother liquors will yield a small amount of oxalic acid more or less impure and may be resorted to if desired.

The yield of oxalic acid from the first crystallization is approximately 30% of the total amount of fulminate produced and as a small amount of oxalic acid can be added thereto by further concentration of the mother liquors, the final amount of oxalic acid obtained is, obviously, a considerable item when working on a large scale, and as such forms a valuable by-product when the manufacture of fulminate of mercury is considered.

Having thus described my invention, what I claim and desire to secure by Letters Patent is—

1. The production of oxalic acid from the waste liquors obtained during the manufacture of fulminate of mercury, which consists in subjecting the residual liquors to evaporation and oxidation of the glycolic acid to oxalic acid.

2. The production of oxalic acid from the waste liquors obtained during the manufacture of fulminate of mercury, which consists in subjecting the residual liquors to evaporation and oxidation of the glycolic acid to oxalic acid, crystallizing the oxalic acid, and then removing the crystals from the remaining liquor.

3. The production of oxalic acid from the waste liquors obtained during the manufacture of fulminate of mercury, which consists in subjecting the residual liquors to evaporation and oxidation of the glycolic acid, and then cooling the liquor to permit crystallization of the oxalic acid to take place.

4. The production of oxalic acid from the waste liquors obtained during the manufacture of fulminate of mercury, which consists in subjecting the residual liquors to evaporation until the specific gravity of the liquor approximates 1.200 oxidizing the glycolic acid, and then cooling the liquor to permit the oxalic acid to crystallize.

EDWARD A. BARNES.